(12) United States Patent
Matsuda (10) Patent No.: US 12,169,923 B2
(45) Date of Patent: Dec. 17, 2024

(54) METHOD OF DETECTING AN ABNORMALITY AND ABNORMALITY DETECTION DEVICE

(71) Applicant: TOYOTA JIDOSHA KABUSHIKI KAISHA, Toyota (JP)

(72) Inventor: Tomohiro Matsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 17/578,659

(22) Filed: Jan. 19, 2022

(65) Prior Publication Data

US 2022/0261974 A1    Aug. 18, 2022

(30) Foreign Application Priority Data

Feb. 17, 2021    (JP) .................................. 2021-023265

(51) Int. Cl.
  *G06T 7/00*  (2017.01)
  *G06T 5/00*  (2024.01)
  *G06T 5/50*  (2006.01)

(52) U.S. Cl.
  CPC ................ *G06T 7/001* (2013.01); *G06T 5/00* (2013.01); *G06T 5/50* (2013.01); *G06T 2207/20081* (2013.01); *G06T 2207/20084* (2013.01); *G06T 2207/30108* (2013.01)

(58) Field of Classification Search
  CPC ......... G06T 7/0004; G06T 2207/20081; G06T 2207/20084; G06T 2207/30108; G06T 1/00; G06T 7/00; G06V 10/82
  See application file for complete search history.

(56) References Cited

U.S. PATENT DOCUMENTS

| 2016/0300125 | A1* | 10/2016 | Barker | G06F 18/24133 |
| 2020/0111217 | A1* | 4/2020 | Yokoyama | G06N 3/047 |
| 2020/0364905 | A1* | 11/2020 | Shimodaira | G06N 3/02 |
| 2021/0295485 | A1* | 9/2021 | Miyazawa | G06T 19/006 |
| 2023/0410285 | A1* | 12/2023 | Okuno | G06T 7/001 |

FOREIGN PATENT DOCUMENTS

| JP | 2020-160997 A | 10/2020 |
| JP | 2020181532 A | * 11/2020 |
| KR | 20190042384 A | * 4/2001 |
| WO | WO-2020255224 A1 | * 12/2020 |

* cited by examiner

*Primary Examiner* — Guillermo M Rivera-Martinez
(74) *Attorney, Agent, or Firm* — Oliff PLC (57) ABSTRACT

A method of detecting an abnormality includes: acquiring an image of an inspection target as a captured image; generating a restored image by inputting the captured image into a first learning model, wherein the first learning model has learned with a normal image, wherein the normal image obtained by capturing a normal inspection target; generating a difference image between the captured image and the restored image; generating a restored difference image by inputting the generated difference image into a second learning model, wherein the second learning model has learned with a normal difference image; and detecting abnormality of the inspection target using the difference image and the restored difference image.

7 Claims, 8 Drawing Sheets

METHOD OF DETECTING AN ABNORMALITY AND ABNORMALITY DETECTION DEVICE

CROSS REFERENCE TO RELATED APPLICATIONS

This application is based upon and claims the benefit of priority from the prior Japanese Patent Application No. 2021-23265, filed on Feb. 17, 2021, the content of which is incorporated herein by reference in its entirety.

BACKGROUND

Field

The present disclosure relates to a method of detecting an abnormality and an abnormality detection device.

Related Art

There is a known image processing device that detects the presence of abnormality in an image of a detection target when a difference between a pseudo image generated by the neural network and the image of the inspection target is greater than or equal to a predetermined threshold (for example, Japanese Unexamined Patent Application Publication No. 2020-160997).

However, in such a method of detecting an abnormality using an image of an inspection target, further improvement in its detection accuracy of the abnormality of the inspection target has been required.

SUMMARY

According to one aspect of the present disclosure, a method of detecting an abnormality is provided. The method of detecting an abnormality includes: acquiring an image of an inspection target as a captured image; generating a restored image by inputting the captured image into a first learning model, wherein the first learning model has learned with a normal image, wherein the normal image obtained by capturing a normal inspection target; generating a difference image between the captured image and the restored image; generating a restored difference image by inputting the generated difference image into a second learning model, wherein the second learning model has learned with a normal difference image; and detecting abnormality of the inspection target using the difference image and the restored difference image.

According to the method of detecting an abnormality of this aspect, the restored difference image configured with an extracted factor of over-detection in the difference image can be generated using the second learning model that has learned using the difference image between the captured image and the restored image. Therefore, the factor of over-detection included in the difference image and the abnormality can be distinguished from each other in the detection of the abnormality, which makes it possible to reduce or suppress inconveniences such as erroneous detection of a normal inspection target as the abnormality, thereby improving the detection accuracy of the abnormality.

DETAILED DESCRIPTION

A. First Embodiment

Figure 1:
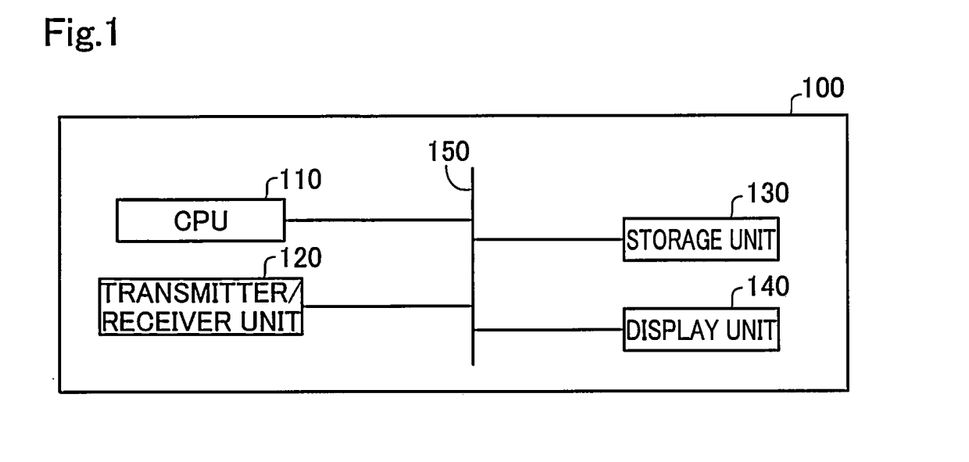
FIG. 1 is a block diagram illustrating an internal functional configuration of an abnormality detection device.

FIG. 1 is a block diagram illustrating an internal functional configuration of an abnormality detection device 100 as a first embodiment of the present disclosure. The abnormality detection device 100 is a personal computer that is connected to an external device. The external device is, for example, a camera that captures images of an inspection target that is inspected by the abnormality detection device 100. In the present embodiment, an image acquired by the abnormality detection device 100 is constituted of an RGB input image signal composed of respective image signal components, represented by R (red), G (green), and B (blue). The input image signal may be, for example, a YUV image signal composed of Y (luminance signal), U (first color difference signal), and V (second color difference signal), a YCbCr image signal, or a YPbPr image signal. The image may be a color image or a grayscale image with luminance values of any color depth, such as 1-bit or 8-bit. The external device may be, for example, a manufacturing device for manufacturing an inspection target, an inspection device for inspecting the inspection target, or a camera provided in these devices.

The abnormality detection device 100 includes a CPU 110, which is a central processing unit, a storage unit 130, a transmitter/receiver unit 120, and a display unit 140. These respective units are communicatively connected to each other via a data bus 150. The CPU 110, the storage unit 130, and the transmitter/receiver unit 120 can communicate with each other bidirectionally. Part or all of the functions of the process in the abnormality detection device 100 may be implemented, for example, in edge or cloud computing. Specifically, the abnormality detection device 100 may acquire an image captured by the external device via a network or other means, process the acquired image by the edge or cloud computing or the like, and then output a process result to the outside via the network.

The CPU 110 is a microprocessor that controls the abnormality detection device 100 in a comprehensive manner. The storage unit 130 is, for example, a RAM, a ROM, or a Hard Disk Drive (HDD) as a mass storage medium. The HDD or ROM stores various programs for implementing the functions provided in the present embodiment. The CPU 110 executes the various programs which are read from the HDD or ROM of the storage unit 130 and expanded on the RAM. A mass storage medium included in the storage unit 130 may be a Solid State Drive (SSD) in place of or along with the HDD.

The transmitter/receiver unit 120 communicates with the external device. In the present embodiment, the transmitter/receiver unit 120 receives an image of an abnormality detection target captured by the external device, through wireless communication. Examples of the wireless communication suitable for use include wireless communication through a wireless local network (LAN) using the 2.4 GHz or 5 GHz band that conforms to the IEEE 802.11a standard, wireless communication using the sub-gigahertz band which is a frequency band below 1 GHz (916.5 MHz to 927.5 MHz), and wireless communication using Bluetooth (registered trademark). The transmitter/receiver unit 120 may be connected to the external device not only wirelessly, but also through a wired LAN such as Ethernet (registered trademark).

The display unit 140 is a display for showing an operation screen of the abnormality detection device 100 and information on the results of abnormality detection performed by the abnormality detection device 100. The display unit 140 may be provided in an external device different from the abnormality detection device 100, such as an inspection device. The abnormality detection device 100 may be equipped with an input device, such as a keyboard, a mouse, or a touch panel, for example.

Figure 2:
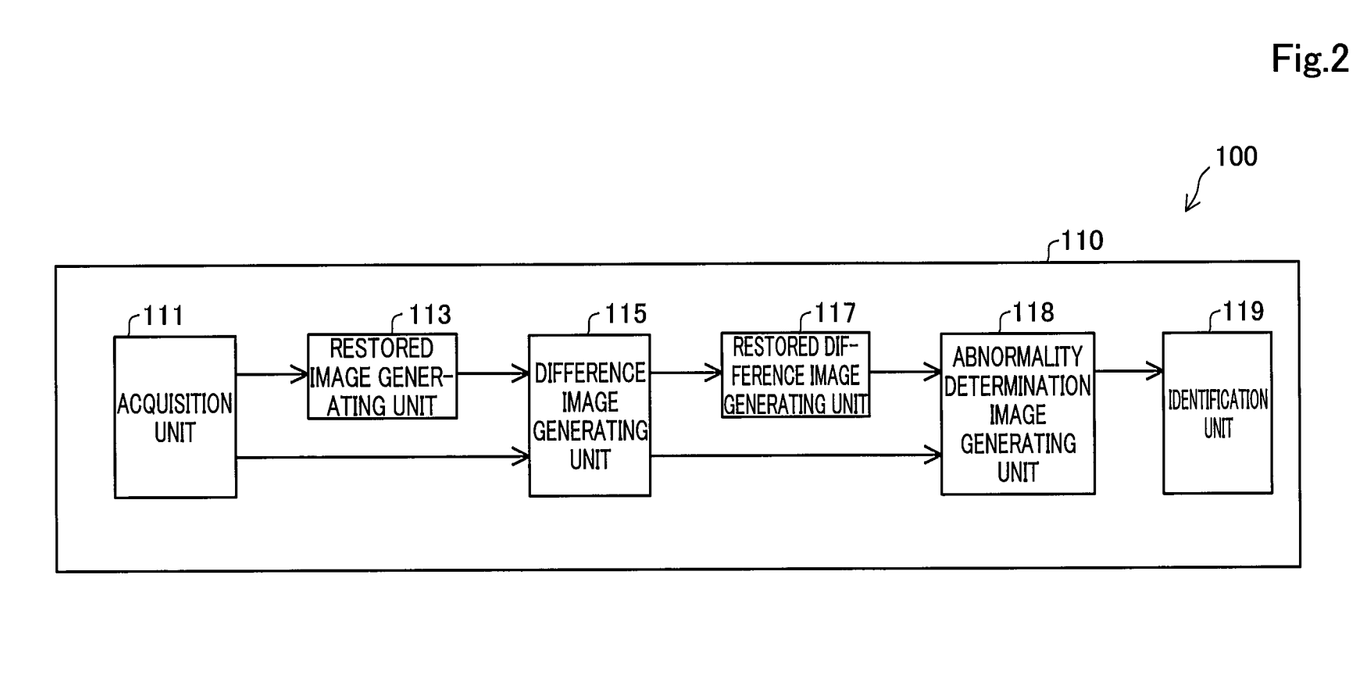
FIG. 2 is a block diagram illustrating an example of a functional configuration of a CPU in the abnormality detection device.

FIG. 2 is a block diagram illustrating an example of a functional configuration of the CPU 110 in the abnormality detection device 100. The CPU 110 functions as an acquisition unit 111, a restored image generating unit 113, a difference image generating unit 115, a restored difference image generating unit 117, an abnormality determination image generating unit 118, and an identification unit 119, by executing various control programs stored in the storage unit 130. Part or all of the functions of the abnormality detection device 100 may be implemented by a hardware circuit.

The function of each unit of the abnormality detection device 100 when executing an abnormality detection process will be described below. The acquisition unit 111 acquires a captured image of the inspection target from the external device in a case where the abnormality of the inspection target is detected. The acquisition unit 111 acquires, as the captured image of the detection target, an image that has the same size as an image acquired as a learning image. The acquisition unit 111 outputs the acquired captured image of the inspection target to the restored image generating unit 113 and the difference image generating unit 115.

The restored image generating unit 113 generates a restored image by restoring the captured image via a learned neural network after acquiring the captured image of the inspection target from the acquisition unit 111. The restored image generating unit 113 outputs the generated restored image to the difference image generating unit 115.

The difference image generating unit 115 generates a difference image between the captured image of the inspection target acquired from the acquisition unit 111 and the restored image acquired from the restored image generating unit 113. The restored image generating unit 113 generates a difference image, for example, by subtracting pixel values of the restored image from pixel values of the captured image. In the present embodiment, the difference image is generated by subtracting a pixel value of a pixel of the restored image for each pixel of the captured image at its corresponding position. Alternatively, the difference image may be generated using a difference for each group including a plurality of pixels. The difference image generating unit 115 outputs the generated difference image to the restored difference image generating unit 117 and the abnormality determination image generating unit 118.

The restored difference image generating unit 117 generates a restored difference image by restoring the acquired difference image via the learned neural network after acquiring the difference image from the difference image generating unit 115. The restored difference image generating unit 117 outputs the generated restored difference image to the abnormality determination image generating unit 118.

The abnormality determination image generating unit 118 generates an abnormality determination image using a difference between the difference image acquired from the difference image generating unit 115 and the restored difference image acquired from the restored difference image generating unit 117. The abnormality determination image generating unit 118 generates the abnormality determination image, for example, by subtracting pixel values of the restored difference image from pixel values of the difference image. In the present embodiment, the abnormality determination image is generated by subtracting a pixel value of a pixel of the restored difference image for each pixel of the difference image at its corresponding position. Meanwhile, the abnormality determination image may be generated using a difference for each group including a plurality of pixels. The abnormality determination image generating unit 118 outputs the generated abnormality determination image to the identification unit 119.

The identification unit 119 detects abnormality of the detection target using the abnormality determination image acquired from the abnormality determination image generating unit 118. In the present embodiment, the identification unit 119 determines that the detection target has the abnormality when the sum of the pixel values included in the abnormality determination image is greater than a predetermined threshold. The identification unit 119 outputs an abnormality determination result to the display unit 140.

Hereinafter, a learning method of learning models included in the abnormality detection device 100 will be described with reference to FIG. 2. The abnormality detection device 100 performs learning of the neural networks included in the restored image generating unit 113 and the restored difference image generating unit 117, as preliminary preparation for executing the abnormality detection process. The neural network included in the restored image generating unit 113 is also referred to as a "first learning model", while the neural network included in the restored difference image generating unit 117 is also referred to as a "second learning model".

The acquisition unit 111 outputs the learning image to the restored image generating unit 113 and the restored difference image generating unit 117 when acquiring the learning image from the external device. In the present embodiment, the acquisition unit 111 acquires an image generated by capturing a normal inspection target (hereinafter also referred to as a "normal image") as the learning image. The normal inspection target means an inspection target that does not have any abnormality. The acquisition unit 111 may acquire captured images of the inspection target with abnormality (hereinafter also referred to as "abnormal images"), for example, as long as the number of abnormal images is less than or equal to a predetermined number.

In the present embodiment, the restored image generating unit 113 includes a generative adversarial network (GAN) as the first learning model. Specifically, the restored image generating unit 113 includes a Conditional GAN (CGAN). The restored image generating unit 113 includes a generating section (Generator) having a neural network for generating pseudo data and a discriminating section (Discriminator) having a neural network for determining authenticity of the pseudo data. When the normal image as the learning image is input to the restored image generating unit 113, the generating section generates a pseudo image. The restored image generating unit 113 causes the discriminator and the generator to learn using the normal image and the pseudo image generated by the generating section using the normal image.

In the present embodiment, the restored difference image generating unit 117 has a CGAN, which is the same type of learning model as that of the restored image generating unit 113, and includes a generating section and a discriminating section. For learning, a normal difference image which is the learning image is input from the difference image generating unit 115 into the restored difference image generating unit 117. The normal difference image means a difference image between the normal image and the restored image generated using the normal image. When learning the second learning model, the restored difference image generating unit 117 causes the discriminator and the generator to learn using the normal difference image and a pseudo image which has been generated by the generating section using the normal difference image. The normal difference image used for the learning of the restored difference image generating unit 117 may be generated using a normal image that is different from the normal image used for the learning of the restored image generating unit 113, for example. The learning of the restored difference image generating unit 117 may be performed using an image that has been separately prepared in advance, for example.

Here, an image that shows an imaging error included in the normal image before restoration can be included in the difference image between the normal image and the restored image generated using the normal image. The imaging error is a portion that can be removed from the normal image during restoration using the first learning model. This portion can cause inconveniences such as an erroneous detection of the normal inspection target as the abnormality. The inconvenience in which the normal inspection target is erroneously detected as having the abnormality is also called over-detection. The imaging errors include, for example, deviation and variations in the position and direction of the detection target in the captured image, and variations in the detection of portions other than the detection target included in the captured image, such as variations in background brightness and stains on the background. The second learning model learns using difference images including the imaging error. Therefore, the restored difference image generating unit 117 generates a restored difference image by restoring a portion that can be removed from the input captured image through the restoration using the first learning model, in other words, a portion corresponding to the imaging error. A large number of difference images configured with extracted imaging errors, i.e., including the number and type of imaging errors which can become a factor of over-detection, are preferably input into the learning contents of the restored difference image generating unit 117. The abnormality detection device 100 of this embodiment makes it possible to obtain the restored difference image that shows the imaging error more clearly. Therefore, this arrangement can enhance the possibility of removing the factor of over-detection and also improve the detection accuracy of the abnormality by the abnormality detection device 100. The expression "removing the factor of over-detection" as used in the present disclosure means the removal of the factor of over-detection from the image.

Figure 3:
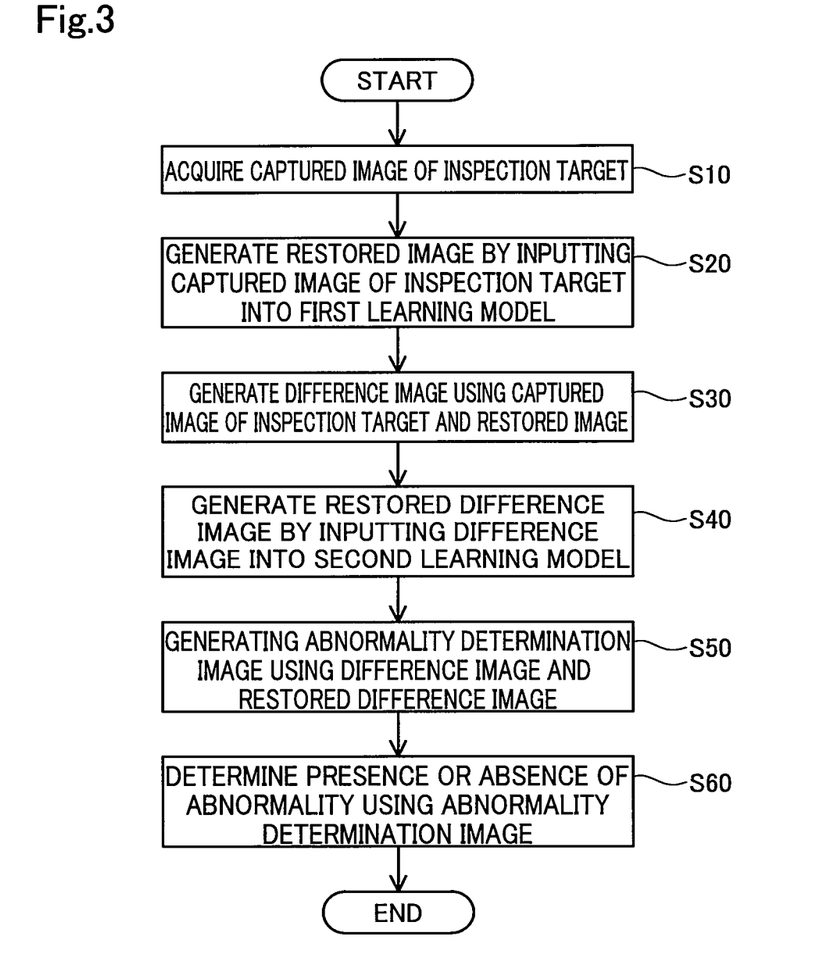
FIG. 3 is a flow diagram illustrating an abnormality detection process executed by the abnormality detection device.

The abnormality detection process executed by the abnormality detection device 100 will be described below using FIGS. 4 to 8 as appropriate along with FIG. 3. FIG. 3 is a flow diagram illustrating the abnormality detection process executed by the abnormality detection device 100. This flow is started, for example, by turning on a power source of the abnormality detection device 100. Alternatively, this flow may be started by inputting the captured image of the inspection target to the acquisition unit 111, or by turning on a power source of the external device connected to the abnormality detection device 100. At the beginning of this flow, the learning of the first learning model in the restored image generating unit 113 using the normal image and the learning of the second learning model in the restored difference image generating unit 117 using the normal difference images are completed.

Figure 4:
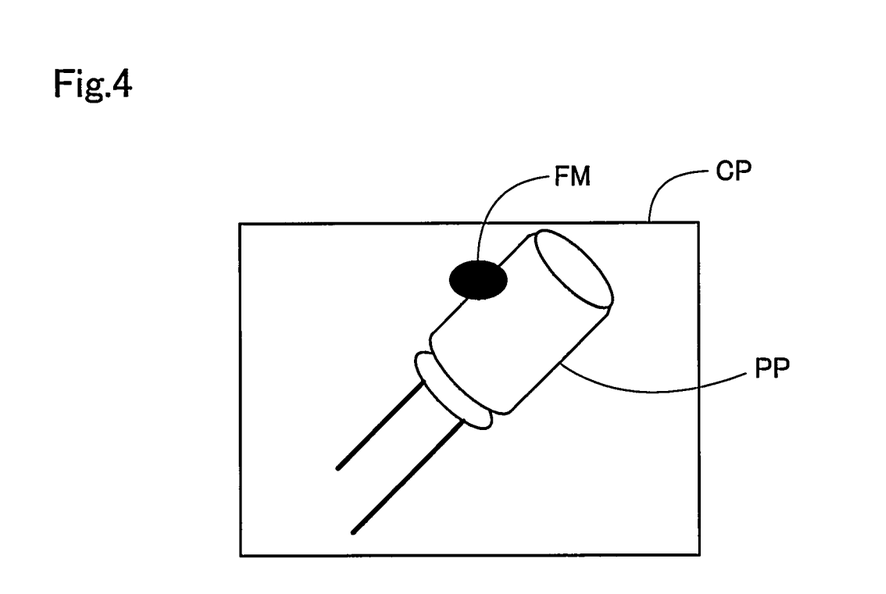
FIG. 4 is an explanatory diagram illustrating a captured image of an inspection target that has been captured by an external device.

In step S10, the acquisition unit 111 acquires a captured image of an inspection target captured by the external device. FIG. 4 is an explanatory diagram illustrating an example of a captured image CP of the inspection target that has been captured by the external device. The captured image CP of the inspection target is input to the acquisition unit 111 from the external device via the transmitter/receiver unit 120 through wireless communication. In FIG. 4, the captured image CP includes an image of a product PP as an example of the inspection target (hereinafter also referred to as a "product image PP"). FIG. 4 also illustrates an example of a state in which foreign matter FM is attached to the product PP as the abnormality of the inspection target. An image of the foreign matter FM is hereinafter also referred to as a "foreign matter image FM". The captured image CP is an example of an abnormal image captured of the inspection target having abnormality. The abnormalities of the inspection target may include not only the attachment of the foreign matter FM, but also various other abnormalities such as a stain on the inspection target, an uneven surface of the inspection target, and a chipped part of a member of the inspection target. In the example of FIG. 4, the captured image CP includes an entire image of the product PP which is the inspection target. However, the captured image CP is not limited to such an entire image of the product PP and may show only a captured portion of the product PP at any position. The acquisition unit 111 outputs the acquired captured image CP to the restored image generating unit 113 and the difference image generating unit 115.

Figure 5:
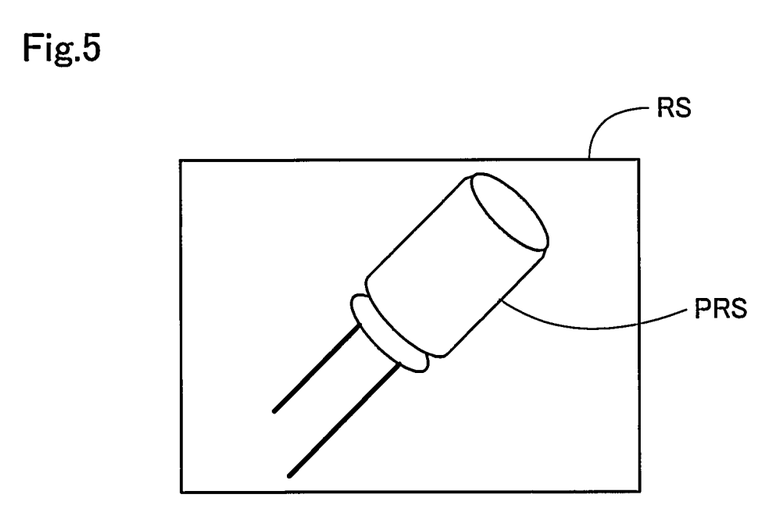
FIG. 5 is an explanatory diagram illustrating an example of a restored image generated by a restored image generating unit.

In step S20, after acquiring the captured image CP illustrated in FIG. 4 from the acquisition unit 111, the restored image generating unit 113 generates a restored image RS using the first learning model that has completed learning. FIG. 5 is an explanatory diagram illustrating an example of the restored image RS generated by the restored image generating unit 113. As described above, the first learning model included in the restored image generating unit 113 has completed the learning using a normal image of the product image PP. Thus, as illustrated in FIG. 5, the restored image RS is obtained through the restoration as an image close to the normal image, with the foreign matter FM not being restored. Therefore, a restored product image PRS included in the restored image RS is generated in the state of not including the foreign matter image FM. At this time, the restored image RS can be obtained through the restoration while removing any imaging errors, such as a positional deviation of the product PP in the captured image CP and variations in the background other than the product PP included in the captured image CP. The restored image generating unit 113 outputs the generated restored image RS to the difference image generating unit 115.

Figure 6:
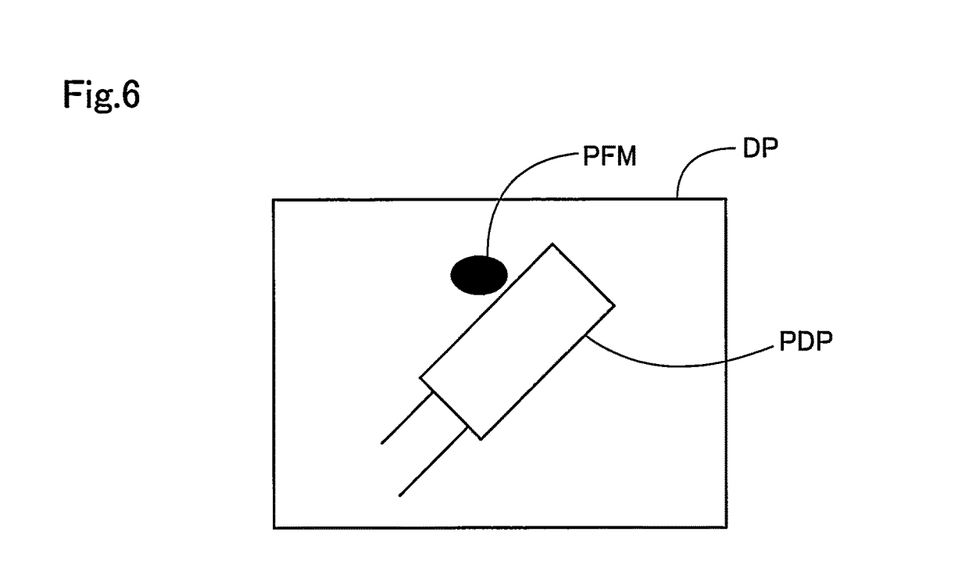
FIG. 6 is an explanatory diagram illustrating an example of a difference image generated by a difference image generating unit.

In step S30, the difference image generating unit 115 generates a difference image DP using a difference between the captured image CP illustrated in FIG. 4 and the restored image RS illustrated in FIG. 5. FIG. 6 is an explanatory diagram illustrating an example of the difference image DP generated by the difference image generating unit 115. The difference image DP is an image formed by a difference obtained by subtracting the pixels of the restored image RS from the pixels of the captured image CP. As illustrated in FIG. 6, a difference abnormal image PFM and a difference extracted image PDP are included in the difference image DP. The difference abnormal image PFM is an image corresponding to the foreign matter image FM illustrated in FIG. 4. The difference extracted image PDP is an image corresponding to a difference obtained by subtracting the pixels of the restored product image PRS from the pixels of the product image PP. In other words, the difference extracted image PDP is said to be an extracted image of an imaging error, which is removed by the restored image generating unit 113 when the restored image RS is generated. The difference image generating unit 115 outputs the generated difference image DP to the restored difference image generating unit 117 and the abnormality determination image generating unit 118.

Figure 7:
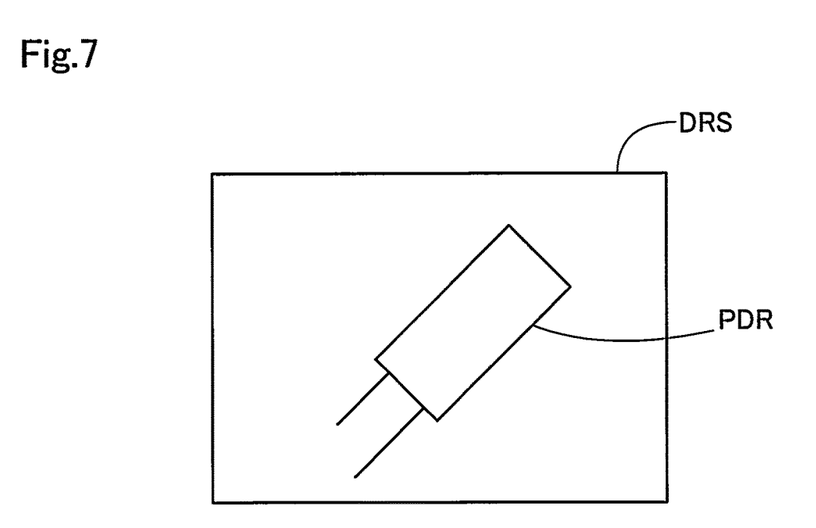
FIG. 7 is an explanatory diagram illustrating an example of a restored difference image generated by a restored difference image generating unit.

In step S40, the restored difference image generating unit 117 generates a restored difference image DRS by restoring the difference image DP using the second learning model that has completed learning after acquiring the difference image DP from the difference image generating unit 115. FIG. 7 is an explanatory diagram illustrating an example of the restored difference image DRS generated by the restored difference image generating unit 117. As described above, the second learning model included in the restored difference image generating unit 117 has completed the learning using normal difference images. Thus, the restored difference image DRS generated by the restored difference image generating unit 117 corresponds to an image obtained by restoring the imaging error included in the difference image DP. Thus, as illustrated in FIG. 7, the restored difference image DRS is generated as an image close to the difference image DP that does not include the difference abnormal image PFM. An imaging error extracted image PDR is an extracted image of the imaging error, which can become the factor of over-detection, in the difference image DP, i.e., an image corresponding to the difference extracted image PDP. The restored difference image generating unit 117 outputs the generated restored difference image DRS to the abnormality determination image generating unit 118.

Figure 8:
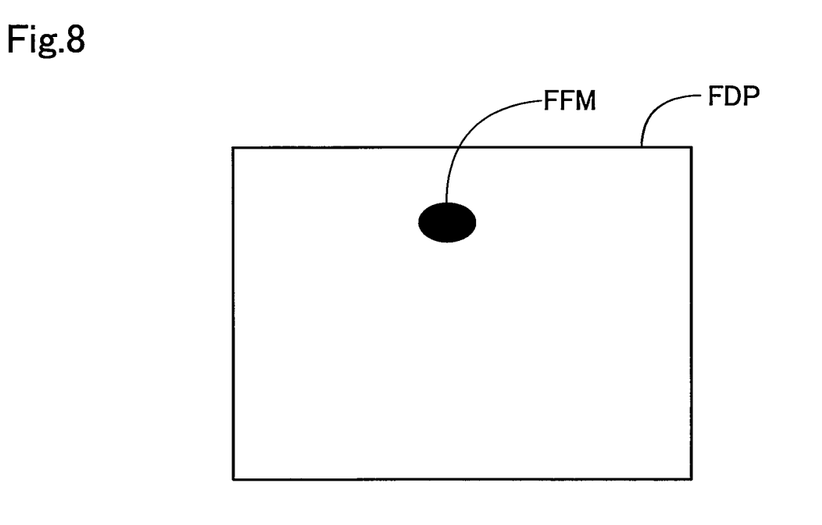
FIG. 8 is an explanatory diagram illustrating an example of an abnormality determination image generated by an abnormality determination image generating unit.

In step S50, the abnormality determination image generating unit 118 generates a difference determination image FDP using a difference between the difference image DP and the restored difference image DRS. FIG. 8 is an explanatory diagram illustrating an example of the abnormality determination image FDP generated by the abnormality determination image generating unit 118. The abnormality determination image generating unit 118 generates the abnormality determination image FDP illustrated in FIG. 8, using a difference obtained by subtracting pixel values of the restored difference image DRS illustrated in FIG. 7 from pixel values of the difference image DP illustrated in FIG. 6. The abnormality determination image FDP corresponds to an image obtained by removing the difference extracted image PDP, which corresponds to the imaging error, from the difference image DP. As illustrated in FIG. 8, a restored difference abnormal image FFM is included in the restored difference image DRS. The restored difference abnormal image FFM corresponds to the difference abnormal image PFM of the difference image DP. The abnormality determination image generating unit 118 outputs the generated abnormality determination image FDP to the identification unit 119.

In step S60, the identification unit 119 determines the presence or absence of the abnormality by detecting the restored difference abnormal image FFM from the abnormality determination image FDP. In the present embodiment, the identification unit 119 detects the restored difference abnormal image FFE to be abnormal if the sum of the pixel values included in the abnormality determination image FDP is greater than the predetermined threshold, and determines that the inspection target has the abnormality. The identification unit 119 determines that the inspection target has no abnormality if the sum of the pixel values included in the abnormality determination image FDP is smaller than the predetermined threshold. In another embodiment of the method of detecting an abnormality using the abnormality determination image FDP, for example, a Gaussian Mixture Model (GMM) or a Deep Autoencoder Gaussian Mixture Model (DAGMM) can be used. In this case, the identification unit 119 may also use a latent variable that indicates an intermediate value at the time of image restoration by the restored difference image generating unit 117, as well as the difference between the difference image DP and the restored difference image DRS. Other detection methods of the restored difference abnormal image FFM in the abnormality determination image FDP may involve, for example, detecting abnormality by extracting feature points or feature quantities corresponding to the restored difference abnormal image FFM in the abnormality determination image FDP. The restored difference abnormal image FFM may be detected by an operator's visual inspection of image data about the abnormal determination image FDP generated by the abnormality determination image generating unit 118. In this case, the identification unit 119 may be omitted. For example, the abnormality may be detected by the operator's visual comparison between image data about the difference image DP illustrated in FIG. 6 and image data about the restored difference image DRS illustrated in FIG. 7. In short, the abnormality may be detected without generating the abnormality determination image FDP. In this case, the abnormality determination image generating unit 118 can be omitted. When the determination of the presence or absence of abnormality of the inspection target by the identification unit 119 is finished, the identification unit 119 outputs the determination result to the display unit 140, and consequently this flow is ended.

As described above, according to the abnormality detection device 100 of the present embodiment, the difference image DP is generated using the difference between the captured image CP and the restored image RS generated using the first learning model that has learned using the normal image. The abnormality of the inspection target is detected by using the generated difference image DP and the restored difference image DRS generated using the second learning model that has learned using the normal difference images. The restored difference image DRS is configured to restore the imaging error, which can become the factor of over-detection, through the learning using the normal difference image. Using this restored difference image DRS and the difference image DP makes it possible to distinguish the difference abnormal image PFM of the inspection target included in the difference image DP from the imaging error which can become the factor of the over-detection. Therefore, this arrangement can detect the abnormality while removing the imaging error when detecting abnormality and can reduce the over-detection, thereby improving the detection accuracy of the abnormality.

According to the abnormality detection device 100 of the present embodiment, the identification unit 119 determines the abnormality of the inspection target using the difference determination image FDP that has been generated using the difference between the difference image DP and the restored difference image DRS. Therefore, the abnormality can be detected using the image from which the factor of over-detection included in the difference image DP is removed.

According to the abnormality detection device 100 of the present embodiment, the first learning model generates the restored image RS by removing the imaging error including the positional deviation of the detection target in the captured image CP. Therefore, the second learning model is capable of learning the imaging error included in the captured image CP, using the difference image DP between the restored image RS generated using the first learning model and the captured image CP.

In the abnormality detection device 100 of the present embodiment, the first learning model is a learning model using the Generative Adversarial Network (GAN). Therefore, the reproducibility of the restored image RS by the first learning model can be enhanced, thereby improving the detection accuracy of abnormality.

In the abnormality detection device 100 of the present embodiment, the second learning model is a learning model using the Generative Adversarial Network (GAN). Therefore, the reproducibility of the restored difference image DRS by the second learning model can be enhanced, thereby improving the detection accuracy of abnormality.

In the abnormality detection device 100 of the present embodiment, the first learning model of the restored image generating unit 113 and the second learning model of the restored difference image generating unit 117 use the same type of learning model, i.e., CGAN. Thus, the tendency of the imaging error removed from the captured image CP based on the restored image RS generated by the first learning model is more likely to coincide with the tendency of the imaging error restored in the restored difference image DRS generated by the second learning model. As a result, the tendency of the imaging error included in the difference image DP is more likely to coincide with the tendency of the imaging error included in the restored difference image DRS, compared to an abnormality detection device that has different types of learning models. Therefore, the imaging error can be removed more accurately using the difference between the difference image DP and the restored difference image DRS.

B. Other Embodiments (B1) In the first embodiment, both the first learning model of the restored image generating unit 113 and the second learning model of the restored difference image generating unit 117 use CGAN by way of example. However, at least one of the restored image generating unit 113 or the restored difference image generating unit 117 may use any other learning models except for CGAN and GAN, various autoencoders such as Autoencoder (AE), Variational Autoencoder (VAE), and Conditional Variational Autoencoder (CVAE), and various GANs such as Deep Convolutional GAN (DCGAN), SRGAN, CycleGAN, and VAEGAN.

The present disclosure is not limited to the embodiments described above and is able to be realized with various configurations without departing from the spirit thereof. For example, technical features in the embodiments may be replaced with each other or combined together as necessary in order to solve part or the whole of the problems described previously or to achieve part or the whole of the effects described previously. When the technical features are not described as essential features in the present specification, they are able to be deleted as necessary. For example, the present disclosure may be realized with embodiments which will be described below.

(1) According to one aspect of the present disclosure, a method of detecting an abnormality is provided. The method of detecting an abnormality includes: acquiring an image of an inspection target as a captured image; generating a restored image by inputting the captured image into a first learning model, wherein the first learning model has learned with a normal image, wherein the normal image obtained by capturing a normal inspection target; generating a difference image between the captured image and the restored image; generating a restored difference image by inputting the generated difference image into a second learning model, wherein the second learning model has learned with a normal difference image; and detecting abnormality of the inspection target using the difference image and the restored difference image.

According to the method of detecting an abnormality of this aspect, the restored difference image configured with an extracted factor of over-detection in the difference image can be generated using the second learning model that has learned using the difference image between the captured image and the restored image. Therefore, the factor of over-detection included in the difference image and the abnormality can be distinguished from each other in the detection of the abnormality, which makes it possible to reduce or suppress inconveniences such as erroneous detection of a normal inspection target as the abnormality, thereby improving the detection accuracy of the abnormality.

(2) In the method of detecting an abnormality of the above-described aspect, in the detecting the abnormality of the inspection target may include: generating an abnormality determination image using a difference between the difference image and the restored difference image, and determining the abnormality of the inspection target using the abnormality determination image.

According to the method of detecting an abnormality of this aspect, the abnormality can be detected using the image from which the factor of over-detection included in the difference image is removed.

(3) In the method of detecting an abnormality of the above-described aspect, the first learning model may generate the restored image by removing a positional deviation of the detection target in the captured image.

According to the method of detecting an abnormality of this aspect, the restored difference image that has learned an imaging error can be generated by inputting a difference between the captured image and the restored image into the second learning model.

(4) In the method of detecting an abnormality of the above-described aspect, the first learning model may be a learning model using a generative adversarial network.

According to the method of detecting an abnormality of this aspect, the reproducibility of the restored image by the first learning model can be enhanced, thereby improving the detection accuracy of abnormality.

(5) In the method of detecting an abnormality of the above-described aspect, the second learning model may be a learning model using a generative adversarial network.

According to the method of detecting an abnormality of this aspect, the reproducibility of the restored difference image by the second learning model can be enhanced, thereby improving the detection accuracy of abnormality.

(6) In the method of detecting an abnormality of the above-described aspect, the first learning model and the second learning model may be the same type of learning model.

According to the method of detecting an abnormality of this aspect, the tendency of an imaging error included in the difference image is more likely to coincide with the tendency of the imaging error included in the restored difference image, compared to the case of having different types of learning models. Therefore, the imaging error can be removed more accurately using the difference between the difference image and the restored difference image.

The present disclosure can also be realized in various forms other than the method of detecting an abnormality. For example, the present disclosure can be realized in the forms of the abnormality detection device, an image processing unit, a manufacturing method of the abnormality detection device, a control method of the abnormality detection device, a computer program for implementing the control method, a non-temporary recording medium having recorded the computer program, and the like.

What is claimed is:

1. A method of detecting an abnormality comprising:
   acquiring an image of an inspection target as a captured image;
   generating a restored image by inputting the captured image into a first learning model, wherein the first learning model has learned with a normal image, wherein the normal image obtained by capturing a normal inspection target;
   generating a difference image between the captured image of the inspection target and the restored image;
   generating a restored difference image by inputting the generated difference image into a second learning model, wherein the second learning model has learned with a normal difference image; and
   detecting abnormality of the inspection target using the difference image and the restored difference image.

2. The method of detecting an abnormality according to claim 1,
   wherein in the detecting the abnormality of the inspection target includes:
   generating an abnormality determination image using a difference between the difference image and the restored difference image, and
   determining the abnormality of the inspection target using the abnormality determination image.

3. The method of detecting an abnormality according to claim 1,
   wherein the first learning model generates the restored image by removing a positional deviation of the inspection target in the captured image.

4. The method of detecting an abnormality according to claim 1,
   wherein the first learning model is a learning model using a generative adversarial network.

5. The method of detecting an abnormality according to claim 1,
   wherein the second learning model is a learning model using a generative adversarial network.

6. The method of detecting an abnormality according to claim 1,
   wherein the first learning model and the second learning model are the same type of learning model.

7. An abnormality detection device, comprising:
   an acquisition unit configured to acquire an image of an inspection target as a captured image;
   a restored image generating unit configured to generate a restored image by inputting the captured image into a first learning model, wherein the first learning model has learned with a normal image, wherein the normal image obtained by capturing a normal inspection target;
   a difference image generating unit configured to generate a difference image between the captured image of the inspection target and the restored image;
   a restored difference image generating unit configured to generate a restored difference image by inputting the generated difference image into a second learning model, wherein the second learning model has learned with a normal difference image; and
   an identification unit configured to detect abnormality of the inspection target using the difference image and the restored difference image.

* * * * *